(12) United States Patent
Shanmukh et al.

(10) Patent No.: US 8,712,947 B2
(45) Date of Patent: Apr. 29, 2014

(54) COLLABORATIVE SYSTEM FOR CAPTURE AND REUSE OF SOFTWARE APPLICATION KNOWLEDGE AND A METHOD OF REALIZING SAME

(75) Inventors: Santosh Shanmukh, Karnataka (IN); Kathik Subbian, Karnataka (IN); Pramod K. H. Subramanya, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 483 days.

(21) Appl. No.: 13/014,759

(22) Filed: Jan. 27, 2011

(65) Prior Publication Data
US 2012/0197832 A1 Aug. 2, 2012

(51) Int. Cl.
G06F 17/00 (2006.01)
G06N 5/02 (2006.01)

(52) U.S. Cl.
USPC .......................................................... 706/46

(58) Field of Classification Search
USPC .......................................................... 706/46
See application file for complete search history.

(56) References Cited

U.S. PATENT DOCUMENTS

| | | | |
|---|---|---|---|
| 5,924,072 A | 7/1999 | Havens | |
| 6,182,067 B1 | 1/2001 | Presnell et al. | |
| 6,640,229 B1 | 10/2003 | Gilmour et al. | |
| 6,834,274 B2 | 12/2004 | Tafoya | |
| 6,871,197 B1 | 3/2005 | Johnson | |
| 6,901,394 B2 | 5/2005 | Chauhan et al. | |
| 7,003,502 B1 | 2/2006 | Wizdo et al. | |
| 7,127,440 B2 | 10/2006 | Jeanblanc et al. | |
| 7,272,610 B2 | 9/2007 | Torres | |
| 7,333,977 B2 | 2/2008 | Swaminathan et al. | |
| 7,401,087 B2 | 7/2008 | Copperman et al. | |
| 7,657,498 B2 | 2/2010 | Palaniappan | |
| 7,991,764 B2* | 8/2011 | Rathod | 707/713 |
| 2006/0031811 A1* | 2/2006 | Ernst et al. | 717/100 |
| 2006/0242195 A1 | 10/2006 | Bove et al. | |

(Continued)

FOREIGN PATENT DOCUMENTS

WO   WO2006068731 A2   6/2006

OTHER PUBLICATIONS

Toward the Development of Cross-Platform Business Applications via Model-driven Transformations, by Akkiraju, published Jul. 2009.*

(Continued)

*Primary Examiner* — Jeffrey A Gaffin
*Assistant Examiner* — Thomas Fink
(74) *Attorney, Agent, or Firm* — Schmeiser, Olsen & Watts; John Pivnichny

(57) ABSTRACT

A method and system for generating an information template from a domain ontology, where the information template is specific to a content management system (CMS). After a domain ontology specification is received, a platform independent model (PIM) is generated that includes elements that represent knowledge in the CMS. The PIM is converted to a platform specific model (PSM) that is based on the CMS. The information template specific to the CMS is generated based on the PSM. A result of generating the information template is a documentation of content for the CMS in a format specified by the information template. An existing CMS is reverse engineered to interoperable forms by retrieving content of the information template in the existing CMS, transforming the content to the PIM, and transforming the PIM to a domain ontology model.

7 Claims, 8 Drawing Sheets

(56) References Cited

U.S. PATENT DOCUMENTS

| | | | |
|---|---|---|---|
| 2008/0181516 A1* | 7/2008 | Jackson | 382/236 |
| 2008/0228812 A1* | 9/2008 | Oglesby et al. | 707/103 R |
| 2008/0276229 A1 | 11/2008 | Hawkins et al. | |
| 2008/0295068 A1 | 11/2008 | Kendall et al. | |
| 2009/0112678 A1 | 4/2009 | Luzardo | |
| 2010/0138808 A1 | 6/2010 | Kim et al. | |
| 2011/0191273 A1* | 8/2011 | Grabarnik et al. | 706/12 |
| 2012/0143570 A1* | 6/2012 | Austin et al. | 703/1 |

OTHER PUBLICATIONS

UML-to-Java transformation in IBM Rational Software Architect editions and related software, by Berfeld, published Dec. 2008.* netbeans.org website, published Jan. 2007.*

Katasonov et al.; Towards Ontology-Driven Development of Applications for Smart Environments; Mar. 2010 IEEE; pp. 696-701. < URL: http://www.webofthings.com/wot/2010/pdfs/147.pdf >.

Pahl et al.; Model-driven Connector Development for Service-based Information System Architectures (search limited to abstract only); Journal of Software, vol. 4, No. 3, May 2009. [online]. 1 page. [retrieved on Aug. 18, 2010]. Retrieved from the Internet: < URL: http://ojs.academypublisher.com/index.php/jsw/article/viewArticle/0403199209 >.

Kazakov, Mikhail; A Methodology of Semi-Automated Software Integration: An Approach Based on Logical Inference; Ph.D. Thesis; Apr. 9, 2004; pp. 116-122. < URL: http://projects.opencascade.org/dl-workbench/files/Final_Kazakov_Ph.D.thesis.pdf >.

Wongthongtham et al.; Software Engineering Ontology for Software Engineering Knowledge Management in Multi-site Software Development Environment. Jul. 2007. 3 pages. < URL: http://whitepapers.techrepublic.com.com/abstract.aspx?docid-399631 >.

Knowledge Management—The Basics. David Skyrme Associates, Sep. 2002. [online]. 3 pages. [retrieved on Aug. 4, 2010]. Retrieved from the Internet: < URL: http://www.skyrme.com/resource/kmbasics.htm >.

Information model—Wikipedia, the free encyclopedia, Oct. 2008. [online]. 4 pages. [retrieved on Jul. 16, 2010]. Retrieved from the Internet: < URL: http://en.wikipedia.org/wiki/Information_model >.

Knowledge management system—Wikipedia, the free encyclopedia, Nov. 2007. [online]. 3 pages. [retrieved on Jul. 16, 2010]. Retrieved from the Internet: <URL: http://en.wikipedia.org/wiki/Knowledge_management_system >.

Gangemi et al.; Core Software Ontology, Core Ontology of Software Components, Core Ontology of Services; Knowledge Management Group Institute AIFB, Karlsruhe Institute of Technology, Aug. 2005 [online]. 4 pages. [retrieved on Jun. 4, 2013]. Retrieved from the Internet: < URL: http://cos.ontoware.org/ >.

Oberle et al.; An extensible ontology software environment, Handbook on ontologies, Handbook on Ontologies, International Handbooks on Information Systems, 2004. 22 pages.

Aldea et al.; An Ontology-Based Knowledge Management Platform, Proceedings of the Workshop on Information Integration on the Web at the 18th International Joint Confernece on Artificial Intelligence, 2003.

* cited by examiner

US 8,712,947 B2

COLLABORATIVE SYSTEM FOR CAPTURE AND REUSE OF SOFTWARE APPLICATION KNOWLEDGE AND A METHOD OF REALIZING SAME

FIELD OF THE INVENTION

The present invention relates to a data processing method and system for collaboratively managing information, and more particularly to collaboratively managing information about software applications.

BACKGROUND

Ineffective management of information about a large number of software applications for an enterprise customer is caused by knowledge erosion due to attrition or internal movement, information scattered across diverse media and in the minds of people (i.e., implicit knowledge), and knowledge gaps that are inherited with a software application and that arise as people learn by experience. Knowledge about applications may be stored as a repository of documents in a content management system, but the knowledge is often outdated, inflexible, and is limited to explicit knowledge such as architecture documents, requirement documents, etc. Using a wiki system, the application knowledge may also be shared among a large number of people in an unstructured fashion, but the content structure becomes inconsistent and a matter of perception of every individual or social group using the wiki system. Thus, there exists a need to overcome at least one of the preceding deficiencies and limitations of the related art.

BRIEF SUMMARY

Embodiments of the present invention provide a method of generating an information template from a domain ontology, the information template being specific to a content management system (CMS). The method comprises:

a computer system receiving a specification of the domain ontology;

the computer system generating a platform independent model (PIM) that includes elements that represent knowledge in the CMS;

the computer system converting the PIM to a platform specific model (PSM) that is based on the CMS; and based on the PSM, the computer system generating the information template specific to the CMS, wherein a result of generating the information template is a documentation of content for the CMS in a format specified by the information template.

In one aspect of the present invention, the computer system reverse engineers an existing CMS to interoperable forms by retrieving content of the information template in the existing CMS, transforming the content of the information template to the PIM, and transforming the PIM to a domain ontology model.

In another aspect of the present invention, the computer system dynamically validates an edit of an existing PIM by receiving the edit of the PIM, determining an undesirable consequence of the edit, check the edit and the consequence against predefined rules, determine whether or not the edit is permitted based on the rules. If the edit is permitted, the computer system generates and sends a warning about the undesirable consequence and performs action(s) on element (s) or part(s) of the PIM that are related or dependent on the element being modified by the edit.

A system, program product and a process for supporting computing infrastructure where the process provides at least one support service are also described and claimed herein, where the system, program product and process for supporting computing infrastructure correspond to the aforementioned method.

Embodiments of the present invention provide a knowledge management system on a flexible, unified, extendable, and scalable platform. The knowledge management system may include a consistent, extendable information structure that allows an organization's professionals of varying expertise and experience to effectively organize, share and access their knowledge of software applications. Further, the knowledge management system may unify knowledge by allowing a community to share knowledge and convert tacit knowledge to explicit form. The knowledge of software applications may be shared in wiki pages in a consistent and professional manner within an organization. The knowledge management system may also provide a flexible information structure that allows modifications and extensions for different types of applications (e.g., mainframe, Java®, etc.) and to implement different ontologies for different kinds of domains (e.g., telecom, banking, retail, etc.). Embodiments disclosed herein also provide a method of capturing the latest information model updates and metrics related the information model to validate consistency.

DETAILED DESCRIPTION

Overview

Embodiments of the present invention may provide a knowledge management system with an extensible and descriptive information model of a domain ontology.

Embodiments disclosed herein may include a mechanism to impose a "controlled structure" on a content management system (CMS) (e.g., a wiki) by means of a domain ontology, thereby providing consistency to usage and perception among users of the CMS. Model-driven architecture and design may be applied to create a platform independent model (PIM) to customize CMSs, where the PIM expresses generic, abstract CMS constructs as modeling elements. Embodiments disclosed herein also may convert a PIM to platform specific models (PSMs) by parsing a PIM to generate and map an information template specific to a target system (i.e., a wiki or other CMS). Embodiments of the present invention may also provide model-driven reverse engineering of an existing wiki or other CMS to interoperable forms.

In one embodiment, the aforementioned domain ontology models a specific domain by representing meanings of terms associated with software applications, such as enterprise application software. In the embodiment described in this paragraph, the wiki or other CMS that comprises the target system includes content associated with software applications.

Collaborative System for Software Application Knowledge Capture And Reuse

Figure 1:
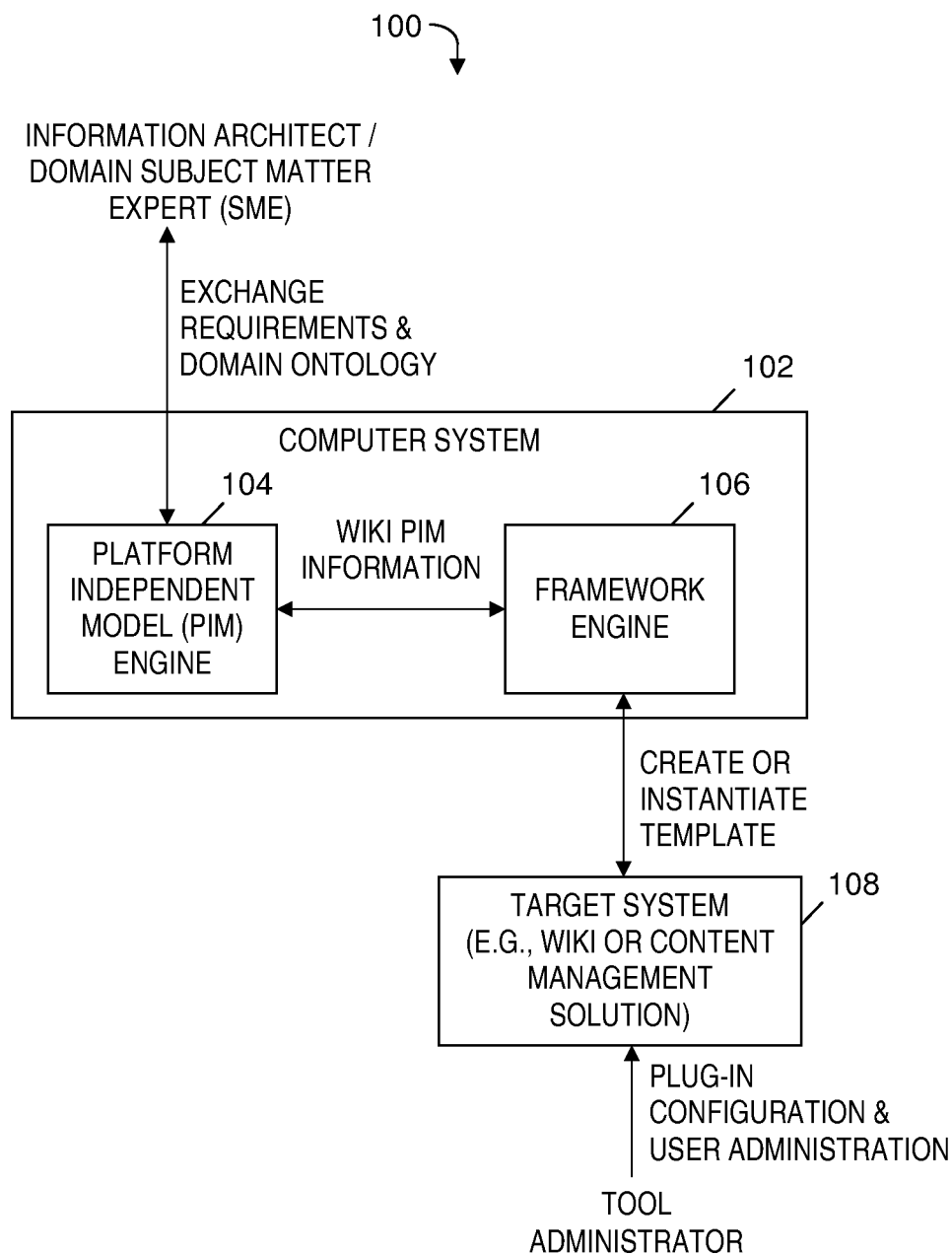
FIG. 1 is a block diagram of a collaborative system for software application knowledge capture and reuse, in accordance with embodiments of the present invention.

FIG. 1 is a block diagram of a collaborative system for software application knowledge capture and reuse, in accordance with embodiments of the present invention. System 100 includes a computer system 102 that includes a software-based PIM engine 104 and a software-based framework engine 106. System 100 also includes a target system 108 (i.e., a wiki or other CMS). A tool administrator provides plug-in configurations and user administration data to administer the platform of the target system.

PIM engine 104 receives requirements of a domain ontology (e.g., as an ontology requirements document) from an information architect and/or domain subject matter expert (SME). The PIM engine 104 converts the domain ontology model specified by the received requirements to a PIM and then provides PIM information to framework engine 106. Framework engine 106 converts the PIM to a PSM and creates or instantiates an information template that is specific to target system 108. Framework engine 106 provides the information template to target system 108 to implement the PSM on the target system.

System 100 allows the creation of a PIM for any domain ontology requirements and provides complete automation from the receipt of the domain ontology model to the instantiation of the information template. System 100 also allows automated reverse engineering of a domain ontology and/or a PIM from an existing information template. System 100 utilizes PIM engine 104 and framework engine 106 as automated substitutes for a tool engineer, where the tool engineer in a known system manually converts the domain ontology specification to a specific platform dependent content management implementation.

More details about the functionality of the components of FIG. 1 are presented below in the discussions of FIGS. 2-5.

PIM engine 104 may be implemented in, for example, Eclipse, which is a software development environment whose development in the open source software community is hosted by Eclipse Foundation, Inc. located in Ottawa, Ontario, Canada.

Target system 108 may include, for example, TWiki®, MediaWiki®, FileNet®, or Alfresco®. TWiki® is a structured wiki application offered by Twiki, Inc. located in Sunnyvale, Calif. MediaWiki® is a web-based wiki application developed by Wikimedia Foundation, Inc. located in San Francisco, Calif. FileNet® is an enterprise content management application offered by International Business Machines Corporation located in Armonk, N.Y. Alfresco® is an enterprise content management system offered by Alfresco Software Ltd. located in Maidenhead, Berkshire, United Kingdom.

As used herein, an ontology is defined as a formal representation of knowledge as a set of concepts within a domain, and relationships between those concepts. As used herein, a domain ontology is defined as an ontology that models a specific domain by representing meanings of terms as the terms apply to that domain. A domain ontology may be provided by an Extensible Markup Language (XML) document that includes a hierarchical classification of vocabulary that is specific to a domain. For example, a domain ontology modeling a software application domain may be provided by an XML document that includes terms such as "application" as a root-level class and "database," "module," "physical system," etc. as sub-classes under the root-level class. As another example, a domain ontology may be provided by a language in the Web Ontology Language (OWL) family of knowledge representation languages. A domain ontology provided by an OWL language includes axioms that specify classes (i.e., sets of individuals) and a set of property assertions that relate the individuals to each other.

Figure 2A:
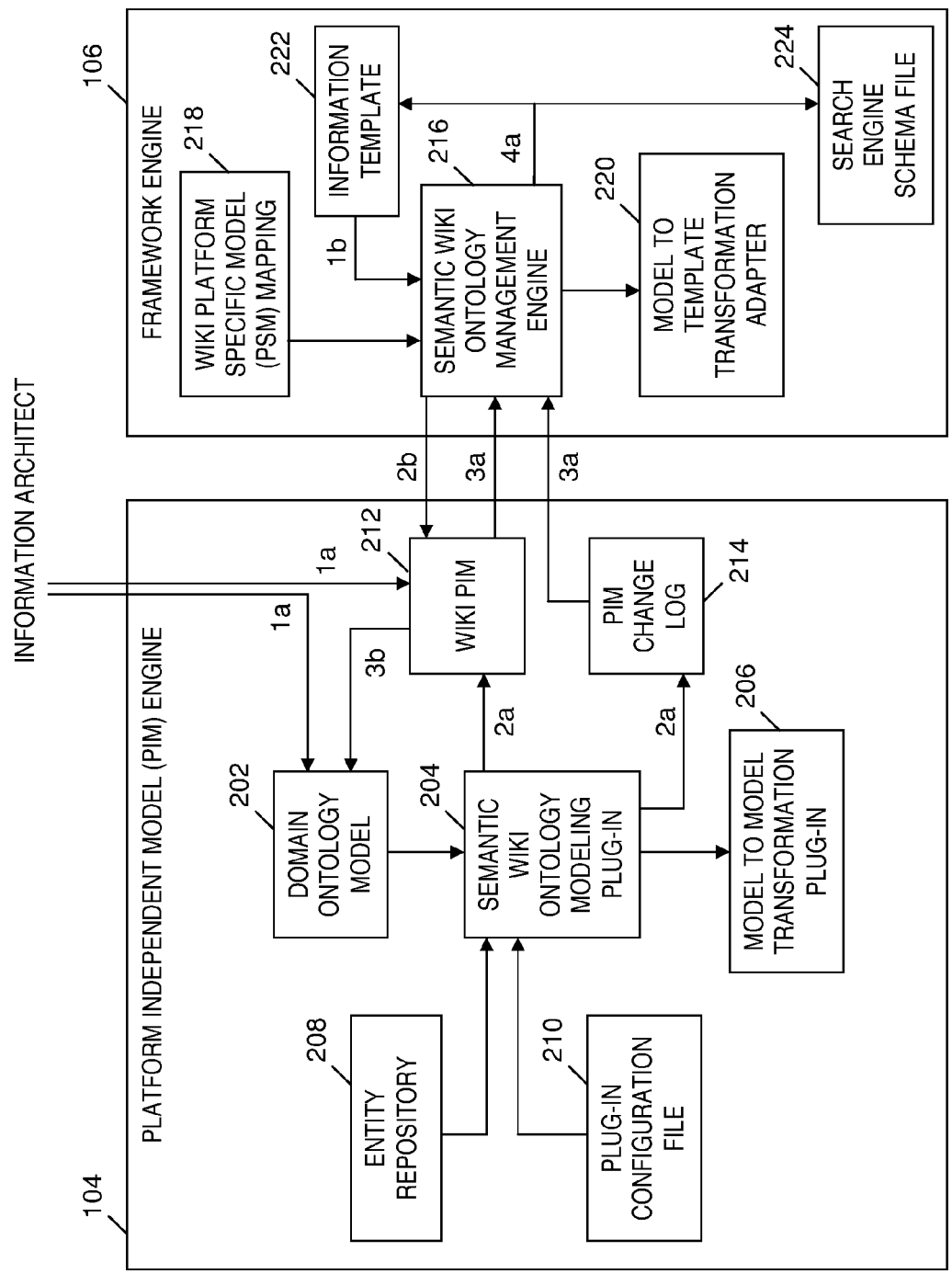
FIG. 2A is a block diagram of a platform independent model and framework engine included in the system of FIG. 1, in accordance with embodiments of the present invention.

FIG. 2A is a block diagram of the platform independent model and framework engine included in the system of FIG. 1, in accordance with embodiments of the present invention. In one embodiment, PIM engine 104 stores a domain ontology model 202, a software-based semantic wiki ontology modeling plug-in 204, a software-based model-to-model transformation plug-in 206, an entity repository 208, a plug-in configuration file 210, a wiki PIM 212 (i.e., a PIM that models knowledge in a wiki platform) and a PIM change log 214. In the aforementioned embodiment, framework engine 106 includes a software-based semantic wiki ontology management engine 216, a wiki PSM mapping 218, a software-based model-to-template transformation adapter 220, an information template 222, and a search engine schema file 224.

Entity repository 208 is an XML file that lists and describes all the elements in the CMS (i.e., target system 108 in FIG. 1), and stores the interrelationships between the elements as a model (e.g., a model for a wiki). Plug-in configuration file 210 stores settings that enable a user to alter the behavior of the semantic wiki ontology modeling plug-in 204 (see FIG. 2A). For example, the settings stored in plug-in configuration file 210 may enable the user to:

Show and hide descriptions of the elements

Enable and disable warnings while creating or editing a model

Import and export PIMs (i.e., PIM change log 214 in FIG. 2A)

Import and export domain ontology models (e.g., domain ontology model 202 in FIG. 2A).

PIM engine 104 receives domain ontology model 202 from an information architect (see arrow 1a pointing to model 202) and may store the model 202 in a format provided by OWL, XML, or the Unified Modeling Language (UML). Semantic wiki ontology modeling plug-in 204 calls model-to-model transformation plug-in 206 to convert the received domain ontology model 202 to wiki PIM 212 (see arrow 2a pointing to PIM 212). In one embodiment, wiki PIM 212 is stored in PIM engine 104 as a UML model.

PIM engine 104 may receive edits (i.e., modifications) to PIM 212 from the information architect (see arrow 1a pointing to PIM 212). In one embodiment, semantic wiki ontology modeling plug-in 204 determines and avoids undesirable consequences of the received modifications to PIM 212 by automatically performing actions to change the structure of PIM 212 by changing elements or parts of PIM 212 that are related to or dependent on the elements of PIM 212 being modified. Semantic wiki ontology modeling plug-in 204 logs the changes resulting from the automatically performed actions in PIM change log 214 (see arrow 2a pointing to log 214). The process for verifying the modifications to the PIM is described in more detail in the discussion presented below relative to FIG. 5.

Semantic wiki ontology management engine 216 receives wiki PIM 212 (see arrow 3a starting at wiki PIM 212) and retrieves changes to wiki PIM 212 stored in log 214 (see arrow 3a starting at log 214). Semantic wiki ontology management engine 216 retrieves a wiki PSM mapping 218 that indicates a mapping from PIM 212 to a PSM that is to be implemented as a particular wiki (i.e., target system 108 in FIG. 1). Ontology management engine 216 utilizes the retrieved mapping and calls model-to-template transformation adapter 220 to generate information template 222 (see arrow 4a pointing to template 222). Content received by the wiki target system is documented in a format specified by the information template 222.

Although the discussion about FIG. 2A presented above describes components of PIM engine 104 and framework engine 106 as generating a PIM and PSM associated with a wiki platform, it should be noted that the present invention is not limited to a wiki platform. The PIM engine and framework engine in FIG. 2A contemplates the generation of a PIM, PSM and information template for representation of knowledge in any type of CMS.

In one embodiment, ontology management engine 216 determines that a change retrieved from log 214 enriches information template 222, and therefore propagates the change to other PSMs as a new information structure.

In one embodiment, information template 222 specifies classifications of a software application-related domain, and these classifications may include Application, Projects & Programs, Services, and Technology & Skills.

In one embodiment, ontology management engine 216 allows a search capability of the wiki content by creating search engine schema file 224 in response to creating information template 222 (see arrow 4a pointing to schema file 224). Search engine schema file 224 is a search engine index file that operates as a keyword file that facilitates the scanning and indexing of wiki pages.

Figure 2B:
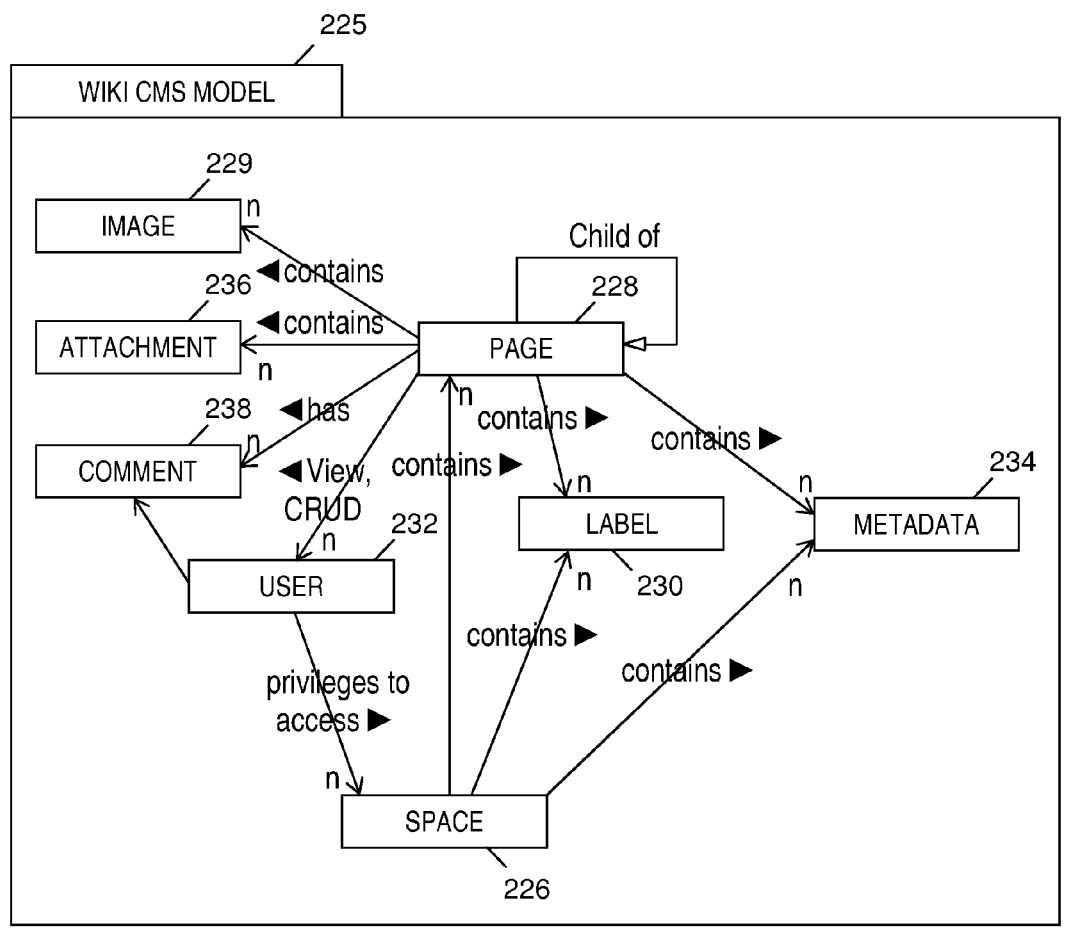
FIG. 2B depicts relationships between elements in a target system in FIG. 1, where the relationships are stored as a wiki model, in accordance with embodiments of the present invention.

FIG. 2B depicts interrelationships between elements of a wiki CMS model 225, where the interrelationships between the elements are stored in entity repository 208 (see FIG. 2A). The aforementioned elements of the wiki are described below:

Space 226: An aggregation of wiki pages intended to store related content about a subject, and a means to control access to one or more users of the wiki.

Page 228: A unit of content storage, which stores free form text with embedded images 229, Uniform Resource Locators (URLs), etc.

Label 230: An entity that is associated with page 228 or space 226, and that enables the aggregation of a set of pages or spaces via a query of the system using the label.

User 232: A person who interacts with the wiki to view, update, create, delete, and/or comment on the content of the wiki.

Metadata 234: An entity that stores information as a name-value pair on page 228 or space 226, and that can be used to query for the value based on the name as the key.

Attachment 236: A document or image that is associated with page 228 or space 226 by means of the user attaching the entity to the page or space.

Comment 238: An entity that is associated with page 228, and that allows users to comment on page 228 via text, typically to express the user's opinion, seek clarification, or add to the information the user sees on the page. Other users may reply to a comment.

Model-Driven Creation of an Information Template from a Domain Ontology

Figure 3A:
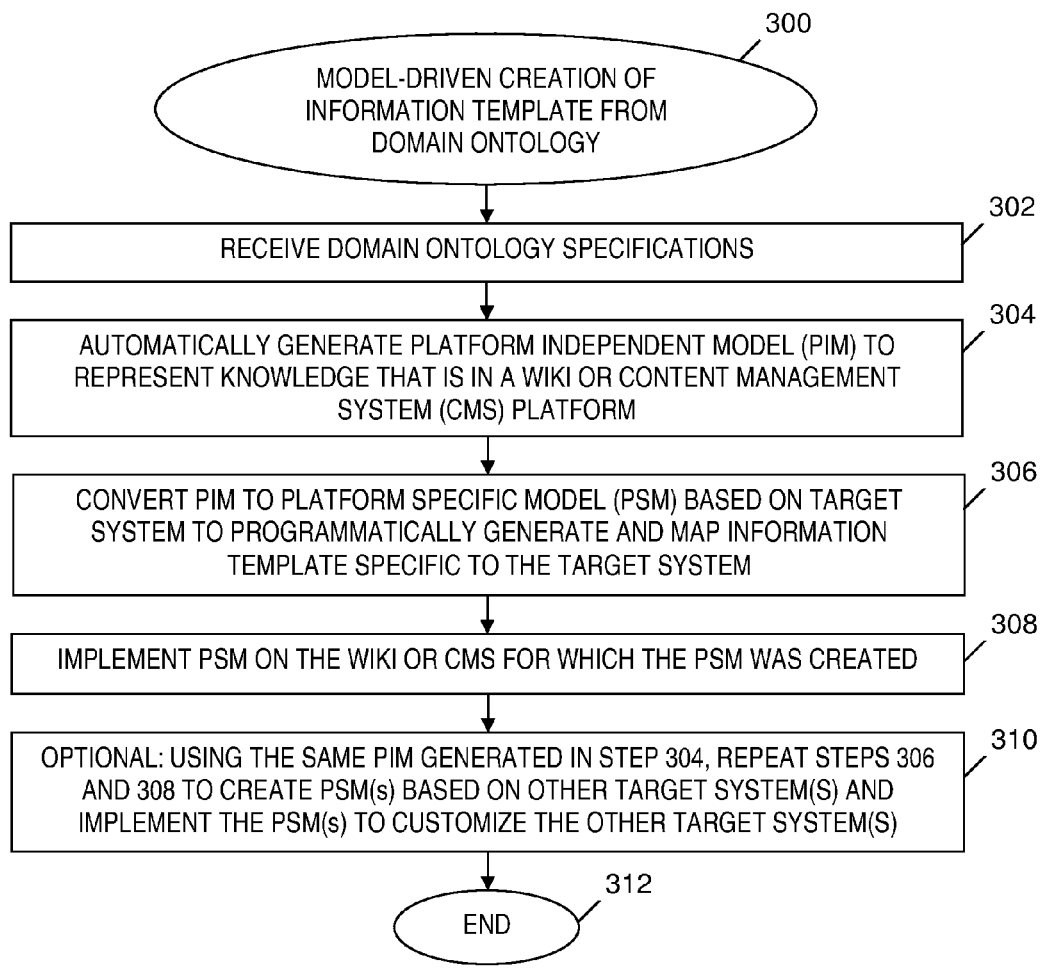
FIG. 3A is a flowchart of a process that is implemented by the system of FIG. 1, and that provides a model-driven creation of an information template from a domain ontology, in accordance with embodiments of the present invention.

FIG. 3A is a flowchart of a process that is implemented by the system of FIG. 1, and that provides a model-driven creation of an information template from a domain ontology, in accordance with embodiments of the present invention. The model-driven process of creating an information template from a domain ontology starts at step 300. In step 302, PIM engine 104 (see FIG. 1 and FIG. 2A) receives specifications for a domain ontology and then stores a domain ontology model 202 (see FIG. 2A) based on the received specifications. In embodiments of the present invention, the domain ontology model is stored in OWL, XML and UML formats. In step 304, semantic wiki ontology modeling plug-in 204 (see FIG. 2A) calls model-to-model transformation plug-in 206 (see FIG. 2A), thereby converting the domain ontology model 202 (see FIG. 2A) to generate PIM 212 (see FIG. 2A) to represent knowledge that is in a wiki or other CMS platform. In one embodiment, the PIM generated in step 304 is a UML model.

Step 304 may include a user creating PIM 212 (see FIG. 2A) using semantic wiki ontology modeling plug-in 204 (see FIG. 2A) in an editor (e.g., Eclipse editor). To create the PIM in step 304, the user first imports the domain ontology model into the editor, which shows all the "information elements" in the model. Then using the editor, the user associates (i.e., interrelates) the core CMS elements stored in entity repository 208 (see FIG. 2A), as described above. Finally, the checks on the model are applied, and the user makes necessary modifications and/or refinements to PIM 212 (see FIG. 2A). In response to completing the aforementioned modifications and/or refinements of step 304, the user may export PIM 212 (see FIG. 2A) as an XML or an XML Metadata Interchange (XMI) file in PIM change log 214 (see FIG. 2A).

Although not shown in FIG. 3A, prior to step 306, PIM engine 104 (see FIG. 1 and FIG. 2A) may receive one or more edits to the PIM 212 (see FIG. 2A) and PIM engine 104 (see FIG. 1 and FIG. 2A) stores the edit(s) in PIM change log 214 (see FIG. 2A). The process of validating the edit(s) is described below relative to FIG. 5.

After step 304 and prior to step 306, PIM engine 104 (see FIG. 1 and FIG. 2A) sends information in the PIM generated in step 304 to framework engine 106 (see FIG. 1 and FIG. 2A).

In step 306, semantic wiki ontology management engine 216 (see FIG. 2A) receives the PIM information (i.e., PIM 212 in FIG. 2A; see arrow 3a starting at PIM 212) from the PIM engine 104 (see FIG. 1 and FIG. 2A) and retrieves any edits to PIM 212 (see FIG. 2A) that are stored in log 214 (see FIG. 2A) (see arrow 3a starting at log 214 in FIG. 2A). Also in step 306, semantic wiki ontology management engine 216 (see FIG. 2A) retrieves a wiki PSM mapping 218 (see FIG. 2A) that indicates a mapping from PIM 212 (see FIG. 2A) to a PSM that is to be implemented as a particular wiki or other CMS (i.e., target system 108 in FIG. 1). Ontology management engine 216 (see FIG. 2A) utilizes the retrieved mapping and retrieved edit(s) and calls model-to-template transformation adapter 220 (see FIG. 2A) to programmatically generate information template 222 (see FIG. 2A) (see arrow 4a pointing to template 222 in FIG. 2A). Content received by target system 108 (see FIG. 1) is documented in a format specified by the information template 222 (see FIG. 2A).

The PSM mapping 218 is a set of one or more XML files with schema (e.g., XSD files) that represents the information elements specific to different CMSs (e.g., MediaWiki®, IBM FileNet®, etc.) and the elements in the appropriate PIM to which they correspond.

The model to template transformation adapter 220 (see FIG. 2A) is a piece of software that implements Application Programming Interfaces (APIs) provided by a particular CMS to interact with the CMS in order to generate or create the information structure and content (i.e., information template 222 in FIG. 2A).

The adapters specific to different CMSs are required to be implemented separately.

In step 308, computer system 102 (see FIG. 1) implements the PSM generated in step 306 on the wiki or other CMS (i.e., the target system) for which the PSM was created. After step 308, the target system receives content that is documented in a format specified by the information template 222 (see FIG. 2A).

In an optional step 310, using the same PIM that was generated in step 304, steps 306 and 308 are repeated one or more times to generate other PSM(s) based on other target system(s) and to implement the other PSM(s) to customize the other target system(s). The process of FIG. 3A ends at step 312.

Figure 3B:
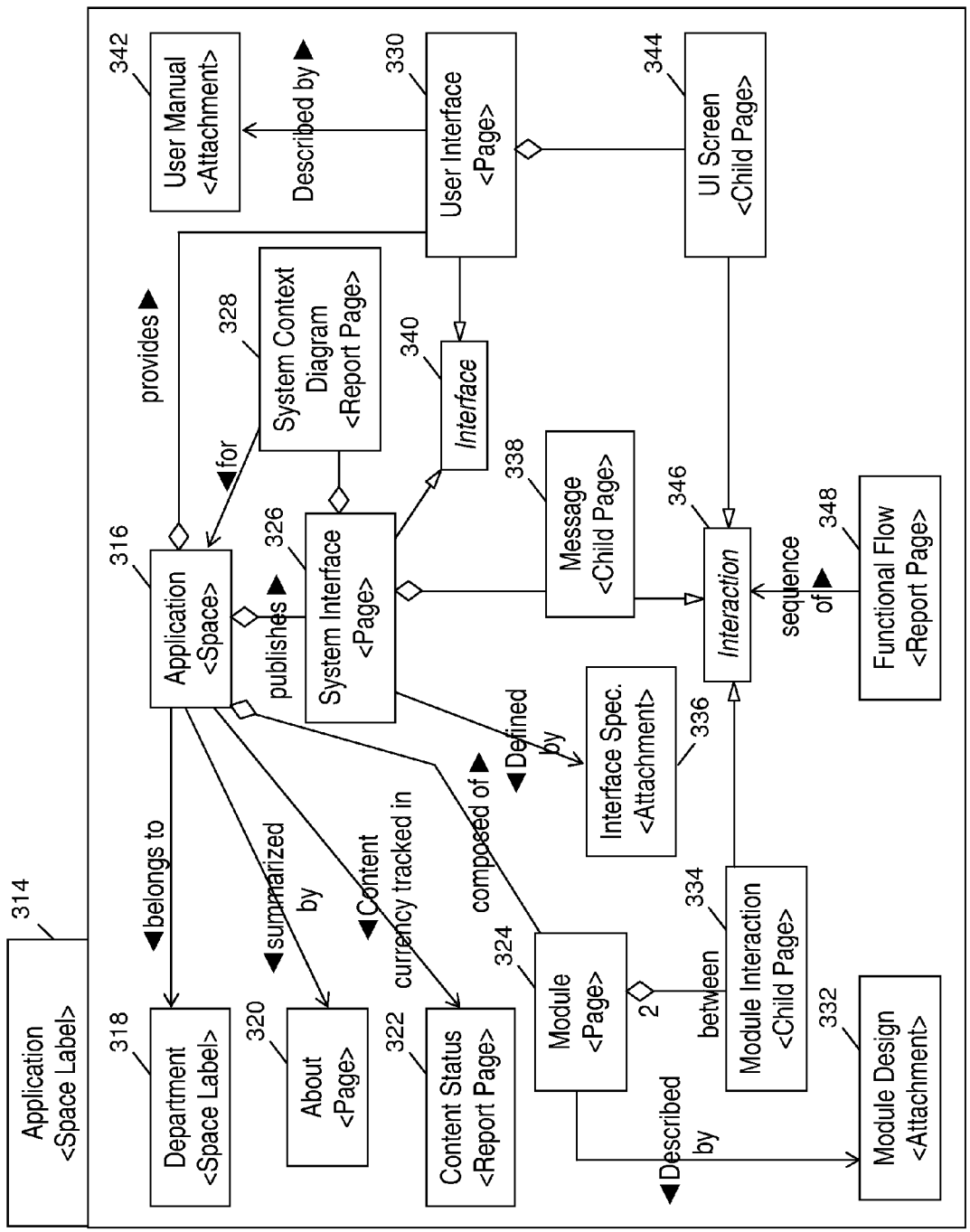
FIG. 3B depicts exemplary information elements that may be utilized in the process of FIG. 3A, in accordance with embodiments of the present invention.

FIG. 3B depicts exemplary information elements in an enterprise software application 314 from the point of view of what a developer or tester needs to know in order to maintain the application. The stereotype annotations in each element shows the core wiki CMS elements to which each of the information elements are mapped. The semantic wiki ontology modeling plug-in 204 (see FIG. 2A) enables the user to perform this association (i.e., mapping) using the editor. The information elements in FIG. 3B may be utilized in step 304 (see FIG. 3A) and include Application 316, Department 318, About 320, Content Status 322, Module 324, System Interface 326, System Context Diagram 328, User Interface 330, Module Design 332, Module Interaction 334, Interface Specification 336, Message 338, Interface 340, User Manual 342, UI Screen 344, Interaction 346 and Functional Flow 348.

Model-Driven Reverse Engineering of an Existing CMS

Figure 4:
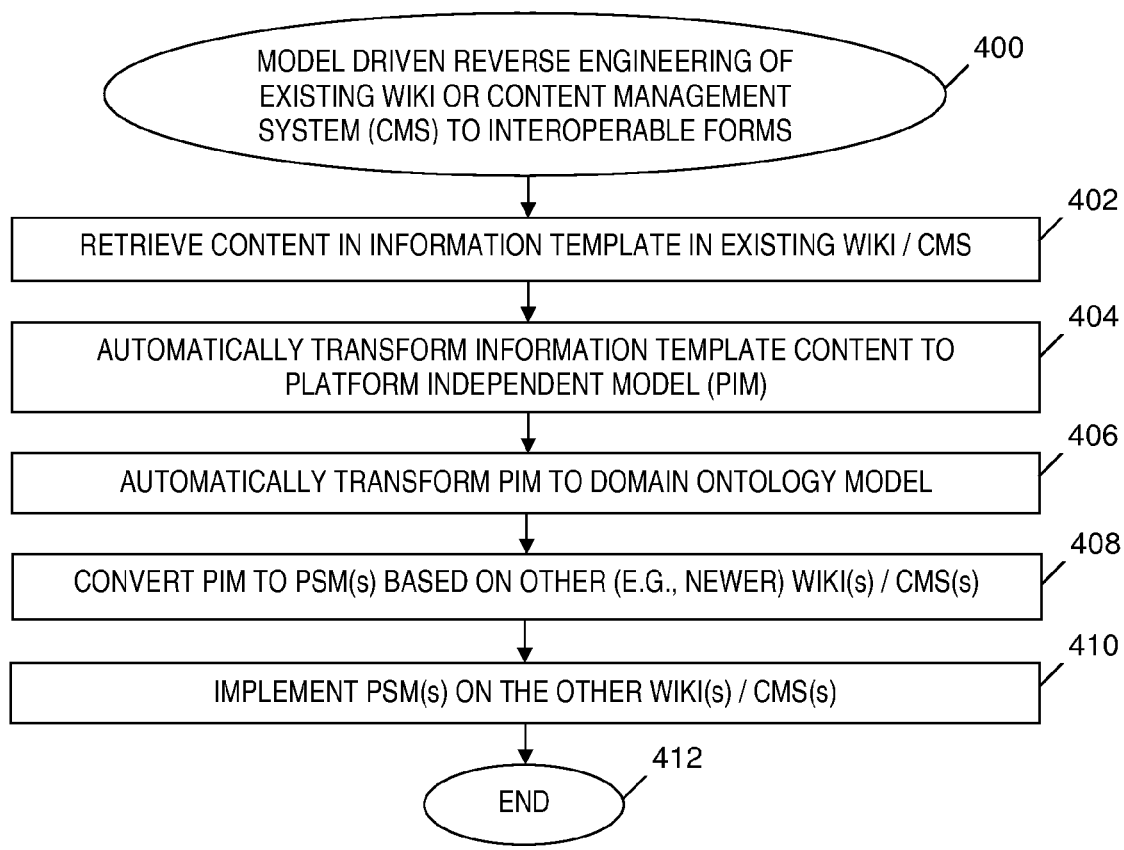
FIG. 4 is a flowchart of a process that is implemented by the system of FIG. 1, and that provides a model-driven reverse engineering of an existing wiki or other content management system into interoperable forms, in accordance with embodiments of the present invention.

FIG. 4 is a flowchart of a process that is implemented by the system of FIG. 1, and that provides a model-driven reverse engineering of an existing wiki or other content management system into interoperable forms, in accordance with embodiments of the present invention. The model-driven process of reverse engineering an existing wiki or other CMS to interoperable forms starts at step 400. In step 402, semantic wiki ontology management engine 216 (see FIG. 2A) retrieves content in information template 222 (see FIG. 2A).

In step 404, semantic wiki ontology management engine 216 automatically transforms the content retrieved in step 402 to generate a PIM, which is stored by PIM engine 104 (see FIG. 2A) as PIM 212 (see FIG. 2A). Step 404 performs the reverse operations analogous to the operations described above relative to step 306 (see FIG. 3A) where the adapter by means of the API provided by the particular CMS, reads the information structure and content, and generates the PSM.

In step 406, semantic wiki ontology modeling plug-in 204 automatically transforms the PIM generated in step 404 to a domain ontology model, which is stored by PIM engine 104 (see FIG. 2A) as domain ontology model 202 (see FIG. 2A). In one embodiment, step 406 allows a user to generate the domain ontology model with only the information elements from a PIM as represented by FIG. 3B. The operation in step 406 removes all associations to CMS elements and creates a domain ontology model that is independent of any particular CMS.

In step 408, the reverse engineered PIM (i.e., the PIM generated in step 404) may be used to generate other (e.g., newer) CMS(s) by converting the PIM to other PSM(s) based on the other CMS(s). That is, one or more iterations of the process of FIG. 3A are used to convert the PIM to the other PSM(s).

In step 410, computer system 102 (see FIG. 1) implements the PSM(s) generated in step 408 on the other CMS(s) for which the PSM(s) were created. After step 410, the other CMS(s) receive content that is documented in a format specified by information templates generated by the process of FIG. 3A that converts the PIM to the other PSM(s). The process of FIG. 4 ends at step 412.

Validating an Edit of an Existing PIM

Figure 5:
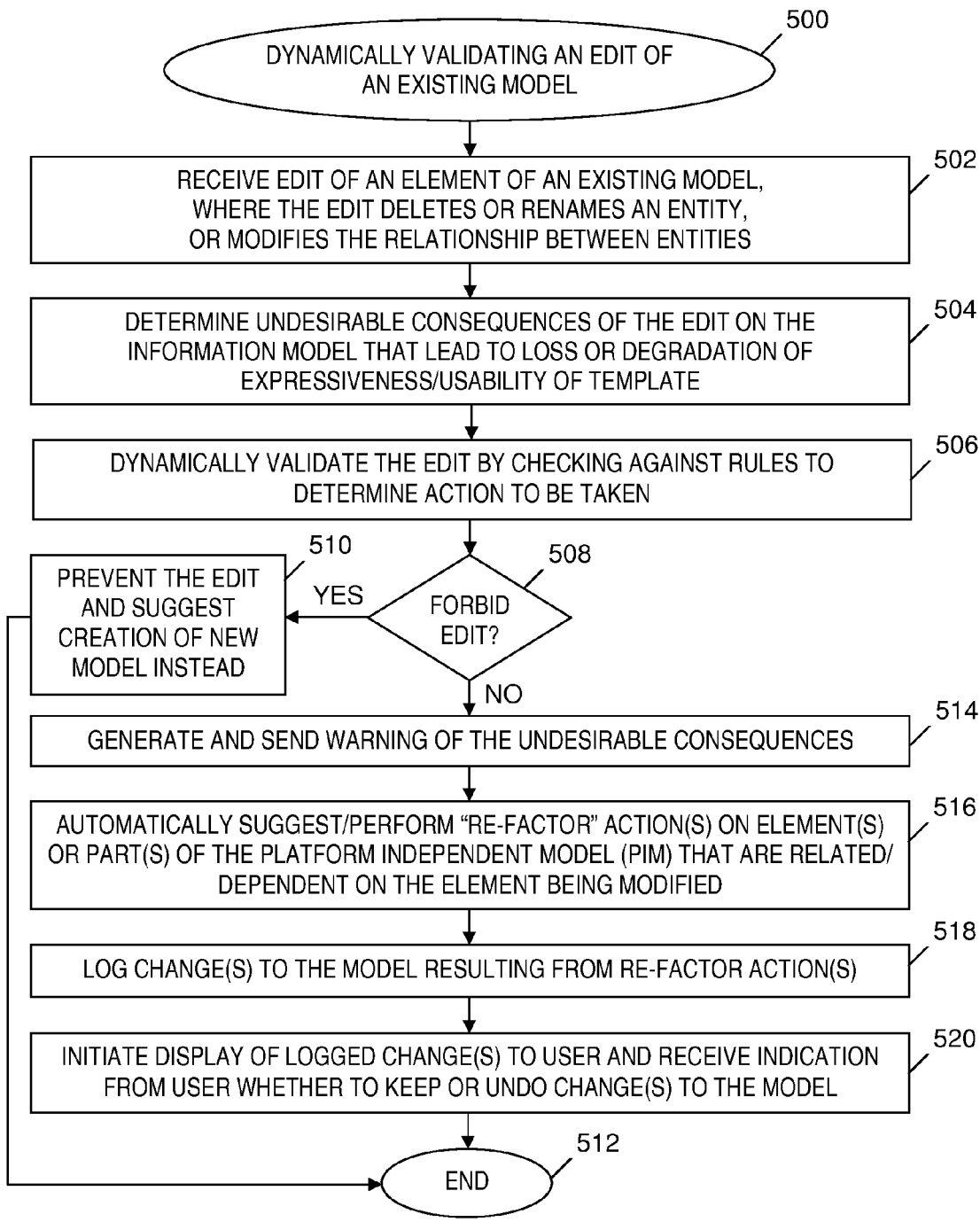
FIG. 5 is a flowchart of a process of dynamically validating an edit of an existing platform independent model in the system of FIG. 1, in accordance with embodiments of the present invention.

FIG. 5 is a flowchart of a process of dynamically validating an edit of an existing PIM in the system of FIG. 1, in accordance with embodiments of the present invention. The dynamic validation process of an edit of an existing PIM starts at step 500. In step 502, PIM engine receives an edit of an element of an existing PIM, where the edit deletes or renames an entity in the PIM, or modified a relationship between entities in the PIM. For example, the edit may delete or rename "page," "label," "metadata," etc. As another example, the edit may move "page" entities across established hierarchies.

In step 504, semantic wiki ontology modeling plug-in 204 (see FIG. 2A) determines one or more undesirable consequences of the edit on the structure of the PIM based on the ontology modeling plug-in 204 checking the edit against predefined rules. The determined consequence(s) are undesirable based on the predefined rules indicating that the edit, if implemented, leads to a loss or degradation of the expressiveness or usability of information template 222 (see FIG. 2A).

Examples of edits and undesirable consequences include:
Deletion of established pages that leads to loss of the information entities in the final information template 222 (see FIG. 2A).
Deletion of tags that leads to certain views or reports not working as intended
Moving of pages that impacts implementation of document generation features that rely on knowing the relative location of pages In step 506, semantic wiki ontology modeling plug-in 204 (see FIG. 2A) validates the edit by checking the undesirable consequence(s) against the predefined rules to determine an action to be taken. If semantic wiki ontology modeling plug-in 204 (see FIG. 2A) determines in step 508 that the edit must be forbidden because of the check against the predefined rules, then the Yes branch of step 508 is taken and step 510 is performed. In step 510, semantic wiki ontology modeling plug-in 204 (see FIG. 2A) forbids the edit (i.e., prevents the edit from occurring) and generates and initiates a display of a suggestion of a creation of a new PIM. Following step 510, the process of FIG. 5 ends at step 512.

Returning to step 508, if semantic wiki ontology modeling plug-in 204 (see FIG. 2A) determines that the edit is not forbidden based on the predefined rules, then the No branch of step 508 is taken and step 514 is performed. In step 514, semantic wiki ontology modeling plug-in 204 (see FIG. 2A) generates and sends a warning to the information architect or another user about the undesirable consequence(s) of the edit. In step 516, semantic wiki ontology modeling plug-in 204 (see FIG. 2A) automatically performs "re-factor" action(s) on element(s) or part(s) of the PIM that are related or dependent on the element being modified by the edit. In an alternate embodiment, step 516 includes the semantic wiki ontology modeling plug-in 204 (see FIG. 2A) automatically sending a suggestion to perform the aforementioned "re-factor" action(s) without automatically performing the action(s).

In step 518, semantic wiki ontology modeling plug-in 204 (see FIG. 2A) stores the change(s) to the PIM resulting from the re-factor action(s) being performed, where the change(s) are stored in PIM change log 214. In step 520, semantic wiki ontology modeling plug-in 204 (see FIG. 2A) initiates a display of the logged change(s) on the computer utilized by the information architect or another user. Subsequently, the information architect or other user reviews the displayed change(s) and sends an indication of whether to keep or undo the change(s). The semantic wiki ontology modeling plug-in 204 (see FIG. 2A) receives the indication from the information architect or other user whether to keep or undo the change(s) to the PIM resulting from the re-factor action(s). If the indication received in step 520 is an instruction to undo the change(s) to the PIM, then semantic wiki ontology modeling plug-in 204 (see FIG. 2A) cancels the change(s) and returns the PIM to its state prior to the change(s). Following step 520, the process of FIG. 5 ends at step 512.

Computer System

Figure 6:
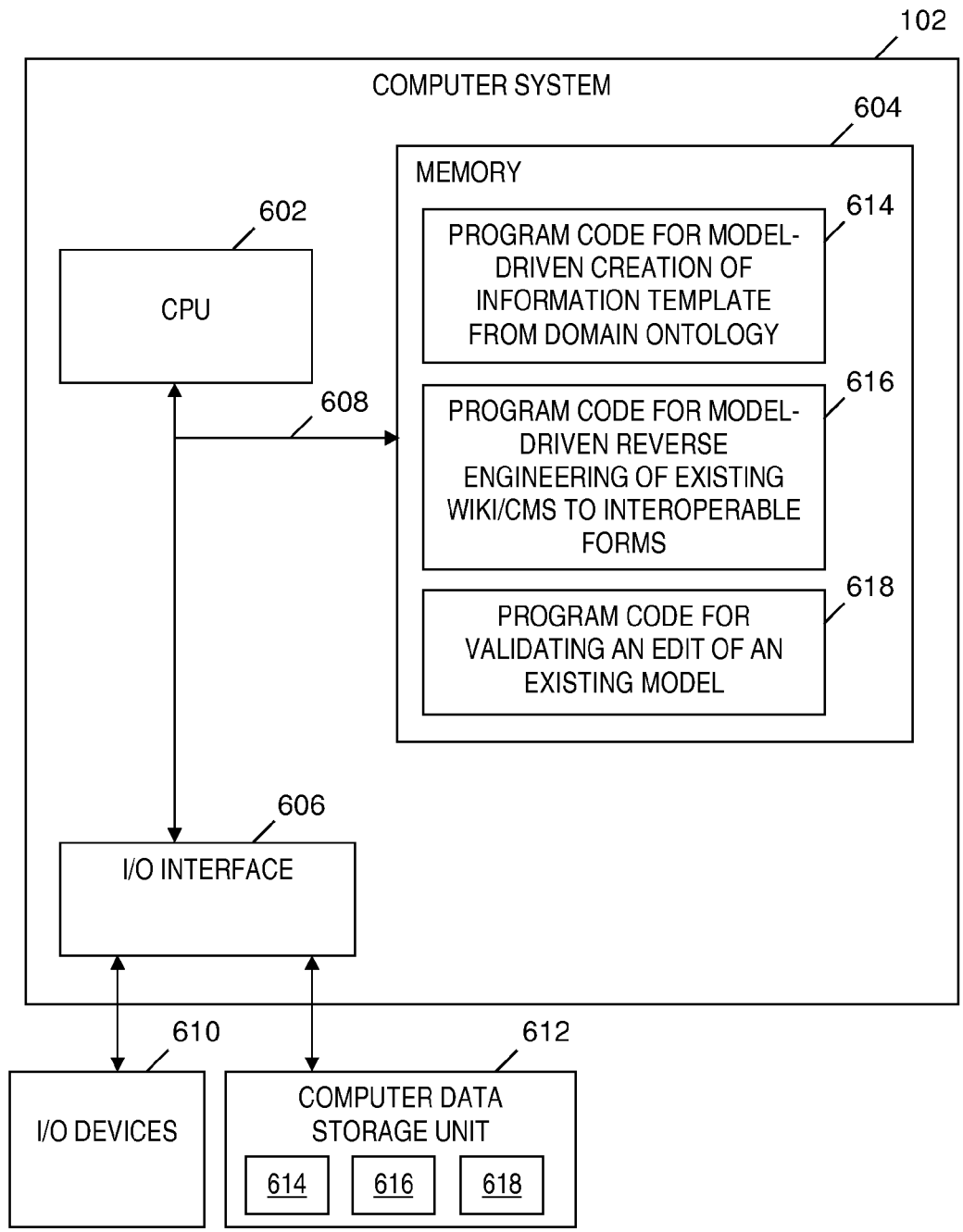
FIG. 6 is a block diagram of a computer system that is included in the system of FIG. 1 and that implements the processes of FIGS. 3-5, in accordance with embodiments of the present invention.

FIG. 6 is a block diagram of a computer system that is included in the system of FIG. 1 and that implements the process of FIGS. 3-5, in accordance with embodiments of the present invention. Computer system 102 generally comprises a central processing unit (CPU) 602, a memory 604, an input/output (I/O) interface 606, and a bus 608. Further, computer system 102 is coupled to I/O devices 610 and a computer data storage unit 612. CPU 602 performs computation and control functions of computer system 102, including carrying out instructions included in program code 614, 616 and 618 to perform a model-driven creation of an information template from a domain ontology, a model-driven reverse engineering of an existing wiki or other CMS to interoperable forms, and a dynamic validation of an edit of an existing PIM, where the instructions are carried out by CPU 602 via memory 604. CPU 602 may comprise a single processing unit, or be distributed across one or more processing units in one or more locations (e.g., on a client and server).

Memory 604 may comprise any known computer-readable storage medium, which is described below. In one embodiment, cache memory elements of memory 604 provide temporary storage of at least some program code (e.g., program code 614, 616 and 618) in order to reduce the number of times code must be retrieved from bulk storage while instructions of the program code are carried out. Moreover, similar to CPU 602, memory 604 may reside at a single physical location, comprising one or more types of data storage, or be distributed across a plurality of physical systems in various forms. Further, memory 604 can include data distributed across, for example, a local area network (LAN) or a wide area network (WAN).

I/O interface 606 comprises any system for exchanging information to or from an external source. I/O devices 610 comprise any known type of external device, including a display device (e.g., monitor), keyboard, mouse, printer, speakers, handheld device, facsimile, etc. Bus 608 provides a communication link between each of the components in computer system 102, and may comprise any type of transmission link, including electrical, optical, wireless, etc.

I/O interface 606 also allows computer system 102 to store information (e.g., data or program instructions such as program code 614, 616 and 618) on and retrieve the information from computer data storage unit 612 or another computer data storage unit (not shown). Computer data storage unit 612 may comprise any known computer-readable storage medium, which is described below. For example, computer data storage unit 612 may be a non-volatile data storage device, such as a magnetic disk drive (i.e., hard disk drive) or an optical disc drive (e.g., a CD-ROM drive which receives a CD-ROM disk).

Memory 604 and/or storage unit 612 may store computer program code 614, 616, 618 that includes instructions that are carried out by CPU 602 via memory 604 to perform a model-driven creation of an information template from a domain ontology, a model-driven reverse engineering of an existing wiki or other CMS to interoperable forms, and a dynamic validation of an edit of an existing PIM. Although FIG. 6 depicts memory 604 as including program code 614, 616 and 618, the present invention contemplates embodiments in which memory 604 does not include all of code 614, 616 and 618 simultaneously, but instead at one time includes only code 614, only code 616, only code 618, only a portion of code 614, 616 and/or 618, or a combination of code 614, 616 and 618.

Further, memory 604 may include other systems not shown in FIG. 6, such as an operating system (e.g., Linux) that runs on CPU 602 and provides control of various components within and/or connected to computer system 102.

Storage unit 612 and/or one or more other computer data storage units (not shown) that are coupled to computer system 102 may store entity repository 208 (see FIG. 2A), plug-in configuration file 210 (see FIG. 2A), domain ontology model 202 (see FIG. 2A), wiki PIM 212 (see FIG. 2A), PIM change log 214 (see FIG. 2A), wiki PSM mapping 218 (see FIG. 2A), information template 222 (see FIG. 2A) and search engine schema file 224 (see FIG. 2A).

As will be appreciated by one skilled in the art, the present invention may be embodied as a system, method or computer program product. Accordingly, an aspect of an embodiment of the present invention may take the form of an entirely hardware aspect, an entirely software aspect (including firmware, resident software, micro-code, etc.) or an aspect combining software and hardware aspects that may all generally be referred to herein as a "module". Furthermore, an embodiment of the present invention may take the form of a computer program product embodied in one or more computer-readable medium(s) (e.g., memory 604 and/or computer data storage unit 612) having computer-readable program code (e.g., program code 614, 616 and 618) embodied or stored thereon.

Any combination of one or more computer-readable mediums (e.g., memory 604 and computer data storage unit 612) may be utilized. The computer readable medium may be a computer-readable signal medium or a computer-readable storage medium. In one embodiment the computer-readable storage medium is a computer-readable storage device or computer-readable storage apparatus. A computer-readable storage medium may be, for example, but not limited to, an electronic, magnetic, optical, electromagnetic, infrared or semiconductor system, apparatus, device or any suitable combination of the foregoing. A non-exhaustive list of more specific examples of the computer-readable storage medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be a tangible medium that can contain or store a program (e.g., program 614, 616 and 618) for use by or in connection with a system, apparatus, or device for carrying out instructions.

A computer readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with a system, apparatus, or device for carrying out instructions.

Program code (e.g., program code 614, 616 and 618) embodied on a computer-readable medium may be transmitted using any appropriate medium, including but not limited to wireless, wireline, optical fiber cable, RF, etc., or any suitable combination of the foregoing.

Computer program code (e.g., program code 614, 616 and 618) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 102 or another computer system (not shown) having components analogous to the components of computer system 102 included in FIG. 6. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIGS. 3-5) and/or block diagrams of methods, apparatus (systems) (e.g., FIG. 1, FIG. 2A, and FIG. 6), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 614, 616 or 618). These computer program instructions may be provided to a processor (e.g., CPU 602) of a general purpose computer, special purpose computer, or other programmable data processing apparatus to produce a machine, such that the instructions, which are carried out via the processor of the computer or other programmable data processing apparatus, create means for implementing the functions/acts specified in the flowchart and/or block diagram block or blocks.

These computer program instructions may also be stored in a computer-readable medium (e.g., memory 604 or computer data storage unit 612) that can direct a computer (e.g., computer system 102), other programmable data processing apparatus, or other devices to function in a particular manner, such that the instructions (e.g., program 614, 616 and 618) stored in the computer-readable medium produce an article of manufacture including instructions which implement the function/act specified in the flowchart and/or block diagram block or blocks.

The computer program instructions may also be loaded onto a computer (e.g., computer system 102), other programmable data processing apparatus, or other devices to cause a series of operational steps to be performed on the computer, other programmable apparatus, or other devices to produce a computer implemented process such that the instructions (e.g., program 614, 616 and 618) which are carried out on the computer, other programmable apparatus, or other devices provide processes for implementing the functions/acts specified in the flowchart and/or block diagram block or blocks.

Any of the components of an embodiment of the present invention can be deployed, managed, serviced, etc. by a service provider that offers to deploy or integrate computing infrastructure with respect to performing a model-driven creation of an information template from a domain ontology, a model-driven reverse engineering of an existing wiki or other CMS to interoperable forms, and a dynamic validation of an edit of an existing PIM. Thus, an embodiment of the present invention discloses a process for supporting computer infrastructure, wherein the process comprises providing at least one support service for at least one of integrating, hosting, maintaining and deploying computer-readable code (e.g., program code 614, 616 and 618) in a computer system (e.g., computer system 102) comprising a processor (e.g., CPU 602), wherein the processor carries out instructions contained in the code causing the computer system to perform a model-driven creation of an information template from a domain ontology, a model-driven reverse engineering of an existing wiki or other CMS to interoperable forms, and/or a dynamic validation of an edit of an existing PIM.

In another embodiment, the invention provides a method that performs the process steps of the invention on a subscription, advertising and/or fee basis. That is, a service provider, such as a Solution Integrator, can offer to create, maintain, support, etc. a process of performing a model-driven creation of an information template from a domain ontology, a model-driven reverse engineering of an existing wiki or other CMS to interoperable forms, and/or a dynamic validation of an edit of an existing PIM. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowcharts in FIGS. 3-5 and the block diagrams in FIG. 1, FIG. 2A and FIG. 6 illustrate the architecture, functionality, and operation of possible implementations of systems, methods, and computer program products according to various embodiments of the present invention. In this regard, each block in the flowchart or block diagrams may represent a module, segment, or portion of code (e.g., program code 614, 616 and 618), which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of generating an information template from a domain ontology, the information template being specific to a wiki, said method comprising:

a computer system receiving a specification of said domain ontology;

said computer system generating a platform independent model (PIM) by converting said domain ontology to said PIM, said PIM including elements that represent knowledge of software applications, said knowledge shared among users utilizing said wiki;

said computer system converting said PIM to a platform specific model (PSM) that is based on said wiki by generating and storing a mapping from said PIM to said PSM, said mapping correlating said PIM and said elements that represent said knowledge of said software applications;

said computer system retrieving said stored mapping from said PIM to said PSM;

based on said retrieved mapping from said PIM to said PSM, said computer system generating said information template specific to said wiki;

said computer system documenting content received by said wiki in a format specified by said information template;

said computer system converting said PIM to other PSMs that are based on other wikis;

said computer system receiving an edit of an element of said PIM, said edit modifies a relationship between entities of said PIM;

based on said edit of said element of said PIM, said computer system changing a structure of said information template;

said computer system propagating said changed structure of said information template to said other PSMs;

said computer system determining said edit of said element of said PIM results in a loss of entities in said information template;

said computer system checking said edit against rules and said computer system determining whether said edit is permitted to be performed based on said rules;

if said edit is not permitted to be performed based on said rules, said computer system preventing said edit from being performed and presenting a suggestion to create a new PIM to replace said PIM; and if said edit is permitted to be performed based on said rules:

said computer system generating and sending a warning about said loss of entities of said information template to a user of said computer system;

said computer system performing an action that causes a change to another element of said PIM that is related or dependent on said element that is to be modified by said edit;

said computer system logging said change to said another element of said PIM caused by said performing said action;

said computer system initiating display of said change to said another element of said PIM caused by said performing said action;

based on a review of said displayed change by said user and subsequent to said performing said action that causes said change, said computer system receiving an indication from said user to undo said change to said another element of said PIM caused by said performing said action; and based on said received indication to undo said change, said computer system undoing said change to said another element of said PIM by returning said PIM to a state existing prior to said performing said action that causes said change to said another element of said PIM.

2. The method of claim 1, further comprising reverse engineering an existing wiki to said PIM, wherein said reverse engineering said existing wiki includes:

said computer system retrieving content in said generated information template in said existing wiki; and said computer system transforming said retrieved content in said information template to said PIM;

said computer system transforming said PIM to a second domain ontology model that is independent of said existing wiki and any other wiki;

subsequent to said transforming said retrieved content in said information template, said computer system converting said PIM to a second PSM based on a second wiki by generating and storing a second mapping from said PIM to said second PSM, said second mapping correlating said PIM and elements in said second wiki;

said computer system retrieving said stored second mapping from said PIM to said second PSM; and based on said retrieved second mapping from said PIM to said second PSM, said computer system generating a second information template specific to said second wiki, wherein a result of said generating said second information template is a documentation of content for said second wiki in a second format specified by said second information template.

3. A computer system comprising:

a processor;

a computer-readable memory coupled to said processor; and a computer-readable tangible storage device coupled to said processor, said storage device including program code configured to be carried out by said processor via said memory to implement a method of generating an information template from a domain ontology, the information template being specific to a wiki, said method comprising:

receiving a specification of said domain ontology;

generating a platform independent model (PIM) by converting said domain ontology to said PIM, said PIM including elements that represent knowledge of software applications, said knowledge shared among users utilizing said wiki;

converting said PIM to a platform specific model (PSM) that is based on said wiki by generating and storing a mapping from said PIM to said PSM, said mapping correlating said PIM and said elements that represent said knowledge of said software applications; and retrieving said stored mapping from said PIM to said PSM;

based on said retrieved mapping from said PIM to said PSM, generating said information template specific to said wiki;

documenting content received by said wiki in a format specified by said information template;
converting said PIM to other PSMs that are based on other wikis;
receiving an edit of an element of said PIM, said edit modifies a relationship between entities of said PIM;
based on said edit of said element of said PIM, changing a structure of said information template;
propagating said changed structure of said information template to said other PSMs;
determining said edit of said element of said PIM results in a loss of entities in said information template;
checking said edit against rules and said computer system determining whether said edit is permitted to be performed based on said rules;
if said edit is not permitted to be performed based on said rules, preventing said edit from being performed and presenting a suggestion to create a new PIM to replace said PIM; and
if said edit is permitted to be performed based on said rules:
generating and sending a warning about said loss of entities of said information template to a user of said computer system;
performing an action that causes a change to another element of said PIM that is related or dependent on said element that is to be modified by said edit;
logging said change to said another element of said PIM caused by said performing said action;
initiating display of said change to said another element of said PIM caused by said performing said action;
based on a review of said displayed change by said user and subsequent to said performing said action that causes said change, receiving an indication from said user to undo said change to said another element of said PIM caused by said performing said action; and
based on said received indication to undo said change, undoing said change to said another element of said PIM by returning said PIM to a state existing prior to said performing said action that causes said change to said another element of said PIM.

4. The system of claim 3, wherein said method further comprises reverse engineering an existing wiki to said PIM, wherein said reverse engineering said existing wiki includes:
retrieving content in said generated information template in said existing wiki; and
transforming said retrieved content in information template to said PIM;
transforming said PIM to a second domain ontology model that is independent of said existing wiki and any other wiki;
subsequent to said transforming said retrieved content in said information template, converting said PIM to a second PSM based on a second wiki by generating and storing a second mapping from said PIM to said second PSM, said second mapping correlating said PIM and elements in said second wiki;
retrieving said stored second mapping from said PIM to said second PSM; and
based on said retrieved second mapping from said PIM to said second PSM, generating a second information template specific to said second wiki, wherein a result of said generating said second information template is a documentation of content for said second wiki in a second format specified by said second information template.

5. A computer program product comprising a computer-readable, tangible storage device coupled to a processor of a computer system, said storage device having computer-readable program code stored therein, said computer-readable program code containing instructions that are carried out by said processor to implement a method of generating an information template from a domain ontology, the information template being specific to a wiki, said method comprising:
receiving a specification of said domain ontology;
generating a platform independent model (PIM) by converting said domain ontology to said PIM, said PIM including elements that represent knowledge of software applications, said knowledge shared among users utilizing said wiki;
converting said PIM to a platform specific model (PSM) that is based on said wiki by generating and storing a mapping from said PIM to said PSM, said mapping correlating said PIM and said elements that represent said knowledge of said software applications;
retrieving said stored mapping from said PIM to said PSM;
based on said retrieved mapping from said PIM to said PSM, generating said information template specific to said wiki;
documenting content received by said wiki in a format specified by said information template;
converting said PIM to other PSMs that are based on other wikis;
receiving an edit of an element of said PIM, said edit modifies a relationship between entities of said PIM;
based on said edit of said element of said PIM, changing a structure of said information template;
propagating said changed structure of said information template to said other PSMs;
determining said edit of said element of said PIM results in a loss of entities in said information template;
checking said edit against rules and said computer system determining whether said edit is permitted to be performed based on said rules;
if said edit is not permitted to be performed based on said rules, preventing said edit from being performed and presenting a suggestion to create a new PIM to replace said PIM; and
if said edit is permitted to be performed based on said rules:
generating and sending a warning about said loss of entities of said information template to a user of said computer system or another computer system;
performing an action that causes a change to another element of said PIM that is related or dependent on said element that is to be modified by said edit;
logging said change to said another element of said PIM caused by said performing said action;
initiating display of said change to said another element of said PIM caused by said performing said action;
based on a review of said displayed change by said user and subsequent to said performing said action that causes said change, receiving an indication from said user to undo said change to said another element of said PIM caused by said performing said action; and
based on said received indication to undo said change, undoing said change to said another element of said PIM by returning said PIM to a state existing prior to said performing said action that causes said change to said another element of said PIM.

6. The program product of claim 5, wherein said method further comprises reverse engineering an existing wiki to said PIM, wherein said reverse engineering said existing wiki includes:
- retrieving content in said generated information template in said existing wiki; and
- transforming said retrieved content in information template to said PIM;
- transforming said PIM to a second domain ontology model that is independent of said existing wiki and any other wiki;
- subsequent to said transforming said retrieved content in said information template, converting said PIM to a second PSM based on a second wiki by generating and storing a second mapping from said PIM to said second PSM, said second mapping correlating said PIM and elements in said second wiki;
- retrieving said stored second mapping from said PIM to said second PSM; and
- based on said retrieved second mapping from said PIM to said second PSM, generating a second information template specific to said second wiki, wherein a result of said generating said second information template is a documentation of content for said second wiki in a second format specified by said second information template.

7. A process for supporting computing infrastructure, said process comprising providing at least one support service for at least one of creating, integrating, hosting, maintaining, and deploying computer-readable code in a computer system comprising a processor, wherein said processor carries out instructions contained in said code causing said computer system to perform a method of generating an information template from a domain ontology, the information template being specific to a wiki, said method comprising:
- said computer system receiving a specification of said domain ontology;
- said computer system generating a platform independent model (PIM) by converting said domain ontology to said PIM, said PIM including elements that represent knowledge of software applications, said knowledge shared among users utilizing said wiki;
- said computer system converting said PIM to a platform specific model (PSM) that is based on said wiki by generating and storing a mapping from said PIM to said PSM, said mapping correlating said PIM and said elements that represent said knowledge of said software applications;
- retrieving said stored mapping from said PIM to said PSM;
- based on said retrieved mapping from said PIM to said PSM, said computer system generating said information template specific to said wiki;
- said computer system documenting content received by said wiki in a format specified by said information template;
- said computer system converting said PIM to other PSMs that are based on other wikis;
- said computer system receiving an edit of an element of said PIM, said edit modifies a relationship between entities of said PIM;
- based on said edit of said element of said PIM, said computer system changing a structure of said information template;
- said computer system propagating said changed structure of said information template to said other PSMs;
- said computer system determining said edit of said element of said PIM results in a loss of entities in said information template;
- said computer system checking said edit against rules and determining whether said edit is permitted to be performed based on said rules;
- if said edit is not permitted to be performed based on said rules, said computer system preventing said edit from being performed and presenting a suggestion to create a new PIM to replace said PIM; and
- if said edit is permitted to be performed based on said rules:
  - said computer system generating and sending a warning about said loss of entities of said information template to a user of said computer system;
  - said computer system performing an action that causes a change to another element of said PIM that is related or dependent on said element that is to be modified by said edit;
  - said computer system logging said change to said another element of said PIM caused by said performing said action;
  - said computer system initiating display of said change to said another element of said PIM caused by said performing said action;
  - based on a review of said displayed change and subsequent to said performing said action that causes said change, said computer system receiving an indication from said user to undo said change to said another element of said PIM caused by said performing said action; and
  - based on said received indication to undo said change, said computer system undoing said change to said another element of said PIM by returning said PIM to a state existing prior to said performing said action that causes said change to said another element of said PIM.

* * * * *